United States Patent [19]

Tae

[11] Patent Number: 5,677,933
[45] Date of Patent: Oct. 14, 1997

[54] DIGITAL SIGNAL ENCODING/DECODING APPARATUSES AND RELATED METHODS

[75] Inventor: Won Kun Tae, Seoul, Rep. of Korea

[73] Assignee: Goldstar Co., Ltd., Seoul, Rep. of Korea

[21] Appl. No.: 354,713

[22] Filed: Dec. 6, 1994

[30] Foreign Application Priority Data

Dec. 6, 1993 [KR] Rep. of Korea ............... 26580/1993
Apr. 28, 1994 [KR] Rep. of Korea ............... 9156/1994

[51] Int. Cl.$^6$ ............................................. G06F 13/00
[52] U.S. Cl. .................... 375/253; 375/243; 341/94; 348/420; 395/2.38
[58] Field of Search .................. 375/241, 243–246, 375/253; 341/94–95, 143, 200; 348/384, 405, 420; 358/433; 364/265.2, DIG. 1; 395/2.38, 2.39

[56] References Cited

U.S. PATENT DOCUMENTS

| | | | |
|---|---|---|---|
| 4,941,152 | 7/1990 | Medan | 375/245 |
| 5,089,818 | 2/1992 | Mahieux et al. | 341/76 |
| 5,235,671 | 8/1993 | Mazor | 395/2 |
| 5,264,846 | 11/1993 | Oikawa | 341/76 |
| 5,475,502 | 12/1995 | Lee et al. | 358/433 |
| 5,495,552 | 2/1996 | Sugiyama et al. | 395/2.1 |
| 5,508,949 | 4/1996 | Konstantinides | 364/725 |
| 5,511,094 | 4/1996 | Lee et al. | 375/243 |
| 5,566,154 | 10/1996 | Suzuki | 369/59 |

*Primary Examiner*—Young T. Tse
*Attorney, Agent, or Firm*—Finnegan, Henderson, Farabow, Garrett & Dunner, L.L.P.

[57] ABSTRACT

In a signal processing method to compress digital audio data by a block floating process, digital signal encoding/decoding apparatuses prevent deterioration of sound quality of the digital audio signal and improve the compression ratio of the digital audio signal when the digital audio signal is converted on a frequency axis per predetermined time frame, and data on the frequency axis is then divided into a plurality of blocks to be recorded, otherwise, bits are allocated per block to compress the digital audio signal for minimizing transmitted parameters. Also, encoding/decoding methods are provided to enable highly efficient encoding/decoding without recording or transmitting word length, allowing one to obtain a high-quality audio signal by allocating bits conventionally held by the word length to hold quantization data of a spectrum signal.

6 Claims, 5 Drawing Sheets

FIG.5

|  | ← LOW BAND | | | | HIGH BAND → | | |
|----|----|----|----|----|----|----|----|
| SF | $sf_0$ | $sf_1$ | $sf_2$ | $sf_3$ | $sf_4$ | $sf_5$ | $sf_6$ |
| N | 7 | ED | | | | | |
| MAIN INFORMATION | | | | | | | |

DIGITAL SIGNAL ENCODING/DECODING APPARATUSES AND RELATED METHODS

BACKGROUND OF THE INVENTION

A. Field of the Invention

The present invention relates to a signal processing method to compress digital audio data by a block floating process and, more particularly, to digital signal encoding/decoding apparatuses suitable for preventing deterioration of the sound quality of a digital audio signal and for improving a compression ratio of the digital audio signal when the digital audio signal is converted on a frequency axis per predetermined time frame, and data on the frequency axis is then divided into a plurality of blocks to be recorded, otherwise, bits are then allocated per block to compress the digital audio signal for minimizing transmitted parameters, and encoding/decoding methods thereof.

B. Description of the Related Art

High efficiency methods of coding digital audio signals include a subband coding (hereinafter referred to as "SBC") method that divides a signal on the time axis of an audio signal into a plurality of frequency bands to code the divided signals, as well as an adaptive transform coding (ATC) method that vertically transforms a signal on a time axis to a signal on a frequency axis to divide the signal into a plurality of frequency bands and adaptively code to respective bands.

FIG. 1 is a block diagram showing a conventional digital data encoder adopting the adaptive transform coding method. As shown in FIG. 1, the conventional digital data encoder includes a PCM data block circuit 1 for dividing received spectrum data PCM into sub-blocks on several time axes. A band-split filter 2 divides output data from the PCM data block circuit 1 per predetermined frequency as in SBC. Furthermore, a time/frequency converter 3 receives output data per frequency band from the band-split filter 2 to convert the received data into a frequency axis perpendicular to the time axis, thereby outputting spectrum data. A scale factor operator 4 allows the spectrum data from the time/frequency converter 3 to be blocks for obtaining scale factor SF per block. To calculate a minimum masking level per block, a masking level operator 5 searches out a tonal component of the spectrum data, i.e., spectrum data of a specific sound, from the time/frequency converter 3 and obtains a masking level. A bit allocation operator 6 determines a word length WL output to allocate bits per block for generating a quantization error smaller than the masking level from the masking level operator 5. A parameter operator 7 obtains parameters by means of a signal from the masking level operator 5 and bit allocation operator 6. A spectrum signal normalizer and quantizer 8 produces quantized spectrum by means of the scale factor SF from the scale factor operator 4 and word length WL from the bit allocation operation 6.

The operation of the conventional digital data encoder constructed as above will be described below.

The PCM audio data on the time axis is formed to be a block through the PCM data block circuit 1, and then band-divided into the predetermined number of subbands (e.g., three or four) via the band-split filter 2 which is similar to the SBC. The subbands are supplied to the time/frequency converter 3. In the time/frequency converter 3, the subbands are subjected to fast Fourier transform (FFT) or discrete cosine transform (DCT) to become a FFT coefficient (or DCT coefficient) that is the spectrum data.

As shown in FIG. 2, the FFT coefficient from the time/frequency converter 3 is divided into blocks $B_0, B_1, \ldots, B_{n-1}$, and then the scale factor SF per block is obtained in the scale factor operator 4. At this time, the scale factor SF may use a peak value of each block or a value obtained by multiplying the average value by a specific coefficient.

A floating coefficient of each block is calculated through the scale operator 4, so that respective blocks are normalized with the floating coefficient, and quantized to the number of bits obtained in the spectrum signal normalizer and quantizer 8. In this case, either the peak value of each block or the value obtained by multiplying the average value by a prescribed coefficient are used as the floating coefficient; otherwise, the floating coefficient is quantized, and the quantized floating coefficient is named as the scale factor SF. Meanwhile, the masking level converter 5 searches out the tonal component of the FFT coefficient (or DCT coefficient) from the time/frequency converter 3 to obtain the masking level considering a man's audible characteristic, and obtains the minimum masking value per block.

Thereafter, the bit allocation operator 6 allocates bits to produce a quantization error smaller than the masking level in accordance with the masking per block. In other words, the bit allocation operator 6 determines the word lengths WL of respective blocks. Then, the parameter operator 7 receives the outputs from the masking level operator 5 and the bit allocation operator 6 to operate the number of blocks recorded or transmitted. That is, the parameter operator 7 determines the number N of the sub-blocks recorded or transmitted.

The spectrum signal normalizer and quantizer 8 normalizes the spectrum signal for each block with respect to the scale factor SF obtained in the scale factor operator 4, and quantizes the spectrum signal in accordance with the word length WL determined in the bit allocation operator 6.

The digital audio data is compressed as described above, and the information, such as the scale factor SF from the scale factor operator 4, word length WL from the bit allocation operator 6, the number N of blocks from the parameter operator 7, as well as quantization data QSP of the spectrum signal from the spectrum signal normalizer and quantizer 8, are recorded or transmitted. Here, the scale factor SF, word length WL and the number N of blocks are designated as side information which is requisite in the conventional technique.

When the conventional ATC method, that necessarily records or transmits three pieces of side information, is applied in the conventional digital signal processing system, there is no problem of favorably executing the compression of the digital audio signal in a certain ratio. Where the parameter operator 7 decreases the number N of blocks in case of unfavorable compression, however, information, is lost when restoring the information thus deteriorating sound quality.

SUMMARY OF THE INVENTION

The present invention is devised to solve the above-described problems. Accordingly, it is an object of the present invention to provide digital signal encoding/decoding apparatuses and digital signal processing methods capable of recording/transmitting much more audio data by allowing for complete restoration of digital audio data without recording/transmitting word lengths, thus minimizing side information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the above objects of the present invention, there is provided a digital signal encoding apparatus which includes a block dividing portion for dividing an input spectrum signal into a plurality of sub-blocks, a scale factor operating portion for obtaining respective scale factors of the sub-blocks from the block dividing portion, and a masking level operating portion for extracting a masking level with respect to the scale factors of the sub-blocks from the scale factor operating portion. The encoding apparatus further includes a block and total energy operating portion for obtaining total block energy and each sub-block energy, using the scale factor from the scale factor operating portion and the masking level from the masking level operating portion. The encoding apparatus also includes an adaptive bit allocating portion for adaptively allocating bits per sub-blocks to determine a word length per blocks using the correlation of the total block energy and each sub-block energy from the block and total energy operating portion, and a parameter operating portion for supplying the number of the sub-blocks by comparing the masking level from the masking level operating portion with the scale factor. The digital signal encoding apparatus also includes a spectrum signal normalizing and quantizing portion for normalizing and quantizing an input spectrum signal to supply quantization data, using the scale factor from the scale factor operating portion and the word length from the adaptive bit allocating portion. The encoder further includes a data storing and error-correction coding portion for formatting and converting the scale factor using the scale factor operating portion, the number of sub-blocks from the parameter operating portion, and the quantization data from the spectrum signal normalizing and quantizing portion into an error correction code. The error-correction coding portion outputs an error correction code.

In addition, there is provided a digital signal decoding apparatus including a data storing and error correcting portion for decoding recorded or transmitted encoding data to supply quantization data, scale factors, error correction data, and the number of sub-blocks, and to correct an error. The decoding apparatus further includes a masking level operating portion for extracting a masking level of the scale factor from the data storing and error correcting portion, and a block and total energy operating portion for calculating sub-block energy and total block energy using the scale factor from the data storing and error correcting portion and the masking level from the masking level operating portion. Further, the decoding apparatus has an adaptive bit allocating portion for obtaining adaptive word length per sub-block, using the correlation of the total block energy and sub-block energy from the block and total energy operating portion, and a quantization-data inverse quantizing portion for performing inverse quantization, using the scale factor, quantization data and the number of sub-blocks from the data storing and error correcting portion and the word length from the adaptive bit allocating portion.

Furthermore, to achieve the above objects of the present invention, there is provided a digital signal encoding method including the steps of time/frequency converting digital audio data divided into a block unit on a predetermined time axis to obtain a corresponding spectrum signal; dividing the spectrum signal into the predetermined number of sub-blocks on a frequency axis; obtaining a scale factor for each sub-block per the partitioned sub-block; extracting a masking level with respect to the scale factor for each sub-block; determining sub-block energy and total block energy using the scale factor for each sub-block and the masking level; allocating bits with respect to respective sub-blocks in accordance with the correlation of sub-block energy with respect to the total block energy; determining the number of sub-blocks to be transmitted and recorded with respect to the masking level and a word length; and normalizing the spectrum signal in accordance with the scale factor for each sub-block; and quantizing the spectrum signal in accordance with the word length.

To further achieve the objects of the present invention, there is provided a digital signal decoding method including the steps of storing transmitted data and extracting a masking level with respect to a scale factor for each sub-block in the stored data; calculating total block energy and sub-block energy using the scale factor for each sub-block and the masking level; obtaining an adaptive word length per sub-block using the correlation of the sub-block energy and total block energy; and performing inverse quantization with respect to quantization data in the stored data by means of the number of sub-blocks, the scale factor for each sub-block, and the word length in the stored data to restore the original spectrum signal.

It is to be understood that both the foregoing general description and the following detailed description are exemplary and explanatory only and are not restrictive of the invention, as claimed.

The accompanying drawings, which are incorporated in and constitute a part of this specification, illustrate the embodiments of the invention and together with the description, serve to explain the principles of the invention.

BRIEF DESCRIPTION OF THE DRAWINGS

The above objects and other advantages of the present invention will become more apparent by describing in detail preferred embodiments thereof with reference to the attached drawings in which:

FIG. 5 is an output table structure of the data storing and error correcting coder of FIG. 3.

DETAILED DESCRIPTION OF THE PREFERRED EMBODIMENTS

Figure 1:
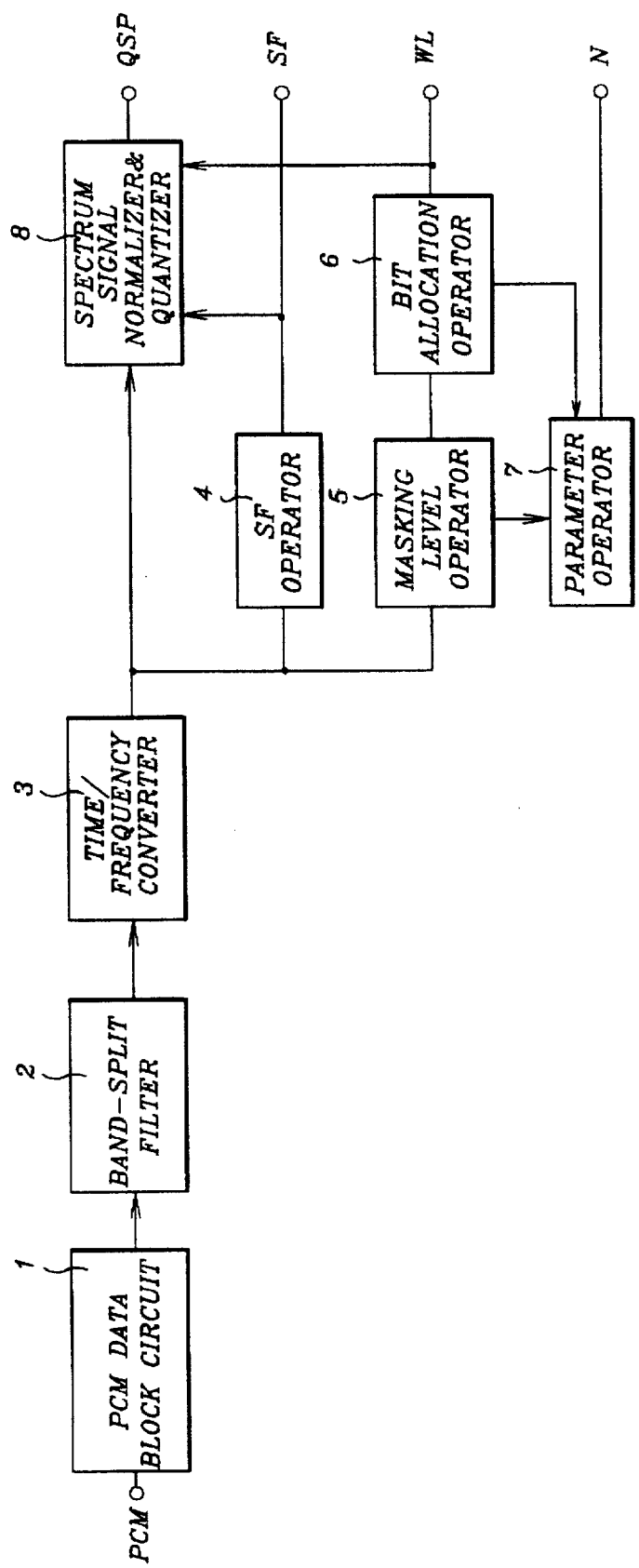
FIG. 1 is a block diagram of a conventional digital data encoder to which the adaptive transform coding method is applied.
Figure 2:
FIG. 2 is a graph of frequency spectrum illustrating coding of a digital signal.
Figure 3:
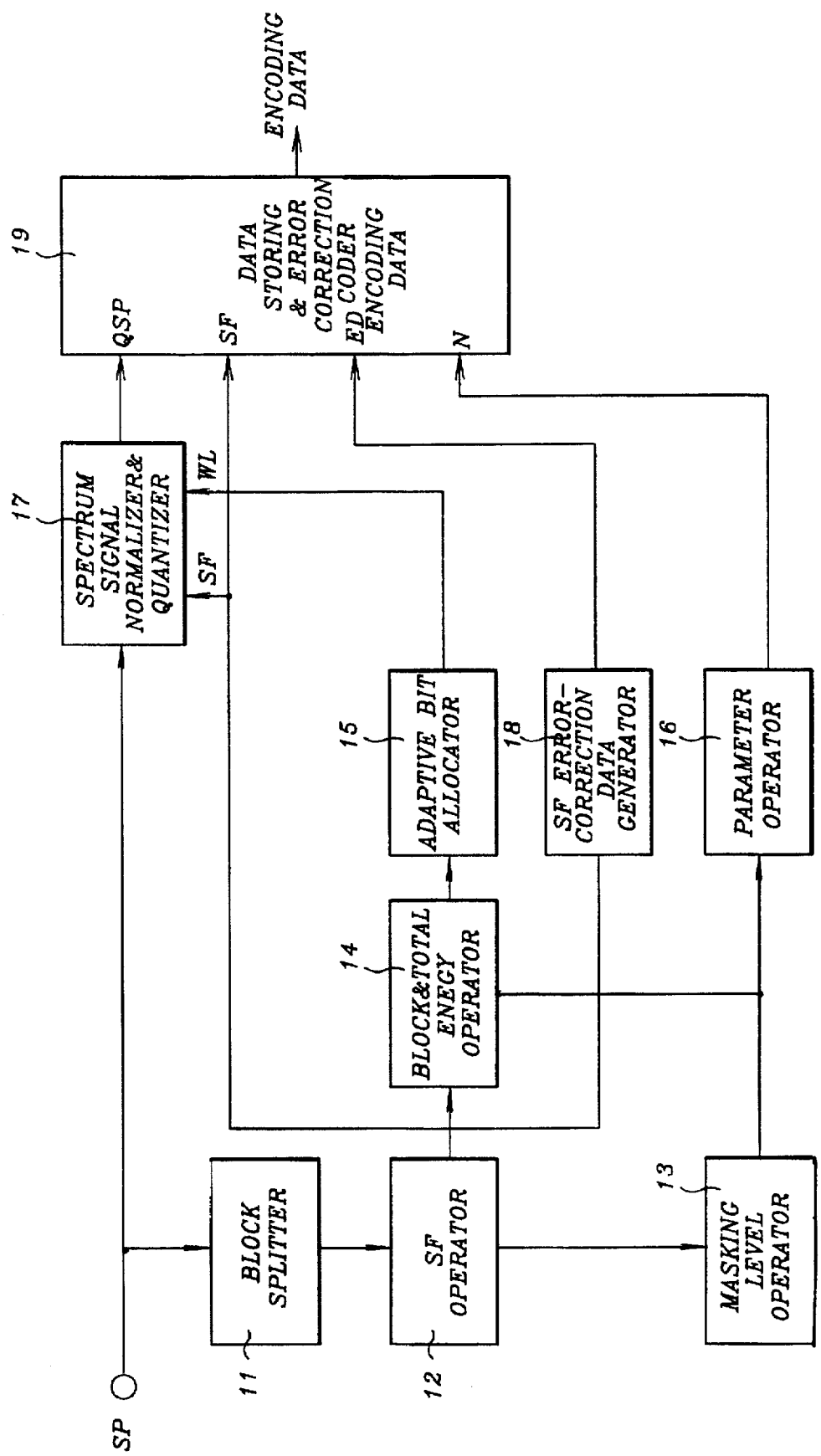
FIG. 3 is a block diagram of a digital signal encoder according to the present invention.

Reference will now be made in detail to the present preferred embodiments of the invention, examples of which are illustrated in the accompanying drawings. As shown in FIG. 3, a digital signal encoder according to the present invention includes a block splitter 11, a scale factor operator 12, a masking level operator 13, a block and total energy operator 14, an adaptive bit allocator 15, a parameter operator 16, a spectrum signal normalizer and quantizer 17, a scale factor error-correcting data generator 18, and a data storing and error-correcting coder 19.

The block splitter 11 divides input spectrum of the signal SP of a block unit into a plurality of sub-blocks, and the scale factor operator 12 obtains scale factors SF of respective sub-blocks from the block splitter 11.

The masking level operator 13 extracts masking levels with respect to the scale factors SF of the sub-blocks from the scale factor operator 12. Here, the masking level is obtained by multiplying a masking effect coefficient affecting one sub-block to other sub-blocks.

The block and total energy operator 14 obtains total block energy and sub-block energy per sub-block, using the scale factors SF from the scale factor operator 12 and masking levels from the masking level operator 13.

The adaptive bit allocator 15 adaptively allocates bits to respective sub-blocks by correlating the sub-block energy and total block energy from the block and total energy operator 14 to determine word lengths WL per block.

The parameter operator 16 compares the masking level from the masking level operator 13 with the scale factor SF to output the number N of the sub-blocks. More specifically, the parameter operator 16 compares the masking level from the masking level operator 13 with the scale factor SF, so that the number N of the transmitted sub-blocks is increased when the scale factor SF is greater than the masking level.

The spectrum signal normalizer and quantizer 17 normalizes and quantizes the input spectrum signal SP to supply quantization data QSP, using the scale factor SF from the scale factor operator 12 and word length WL from the adaptive bit allocator 15.

The scale factor error-correcting data generator 18 produces error correction data ED of the scale factor SF from the scale factor operator 12. That is, the scale factor error-correcting data generator 18 uses the sum of odd numbers, even numbers, or square roots of the scale factors SF from the scale factor operator 12 as the error correction data ED. The error correction data ED is supplied to the data storing and error correcting coder 19.

The data storing and error correcting coder 19 formats the scale factor SF from the scale factor operator 12, the number N of sub-blocks from the parameter operator 16, the quantization data QSP from the spectrum signal normalizer and quantizer 17, and the error correction data ED from the scale factor error-correcting data generator 18, and converts them to an error correction code for output.

Figure 4:
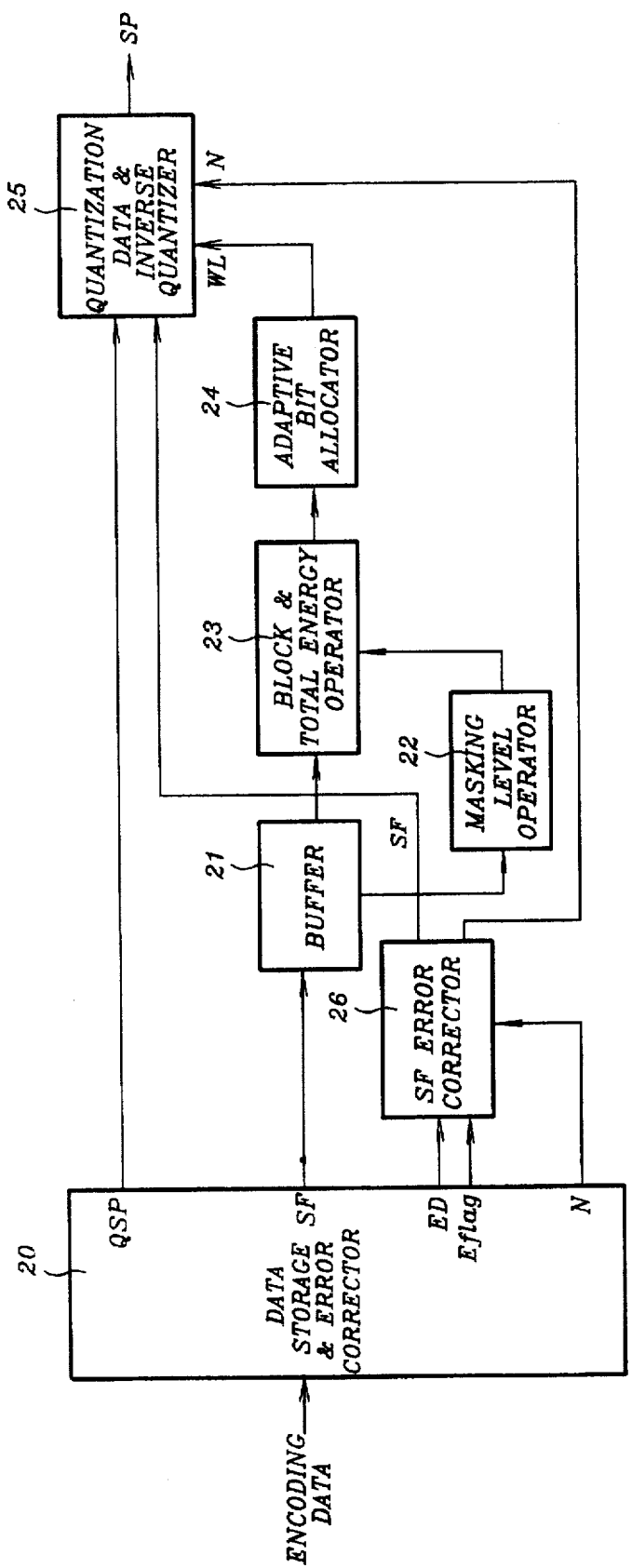
FIG. 4 is a block diagram of a digital signal decoder according to the present invention.

As shown in FIG. 4, a digital signal decoding apparatus, according to the present invention, has a data storage and error corrector 20, a buffer 21, a masking level operator 22, a block and total energy operator 23, an adaptive bit allocator 24, a quantization-data inverse quantizer 25, and a scale factor error corrector 26.

The data storage and error corrector 20 decodes recorded or transmitted encoding data to supply the quantization data QSP, scale factor SF, error correction data ED, and the number N of sub-blocks, and to correct the error. In correcting the error, the data storage and error corrector 20 corrects the error with respect to the correctable error or, alternatively, generates an error flag Eflag with respect to the incorrigible error, which is supplied with the quantization data QSP, scale factor SF, error correction data ED, and the number N of sub-blocks.

The buffer 21 temporarily stores the scale factor SF from the data storage and error corrector 20 and then outputs it to the block and total energy operator 23. The masking level operator 22 extracts the masking level of the scale factor SF from the data storage and error corrector 20 through the buffer 21.

The block and total energy operator 23 calculates the sub-block energy and total block energy by means of the scale factor SF from the data storage and error corrector 20, i.e., the buffer 21 and the masking level from the masking level operator 22. The adaptive bit allocator 24 obtains the adaptive word length per sub-block, using the correlation of the total block energy and sub-block energy from the block and total energy operator 23.

The scale factor error corrector 26 corrects information having the error among the scale factor SF, error correction data ED, and the number N of sub-blocks from the data storage and error corrector 20 by means of entire information with respect to the error designated by the error flag Eflag. Accordingly, the scale factor SF and the number N of sub-blocks are supplied to the quantization-data inverse quantizer 25.

The quantization-data inverse quantizer 25 performs the inverse quantization, using the scale factor SF, quantization data QSP, the number N of sub-blocks, and the word length WL from the adaptive bit allocator 24. In more detail, the quantization-data inverse quantizer 25 performs the inverse quantization by means of the quantization data QSP from the data storage and error corrector 20, the scale factor SF, the number N of sub-blocks from the scale factor error corrector 26, and the word length WL from the adaptive bit allocator 24.

The operation of the digital signal encoding/decoding apparatuses according to the present invention will now be described. To begin with, the encoding of the digital signal, i.e., the spectrum signal, will be described with reference to FIG. 3. The spectrum signal SP which is converted in time and frequency in a time/frequency converter is divided into a plurality of sub-blocks in the block splitter 11. Then, the scale factor SF per sub-block is detected and stored in the scale factor operator 12. This scale factor SF is obtained by a value greater than and approximate to a maximum value of one sub-block while comparing the maximum value with a preset value.

For example, when an analog audio signal is sampled to 44.1 MHz to be received in 512 sample unit, i.e., of about 11.6 ms, the word length of one sample data is 16 bit. Thereafter, the 512 spectrum signals SP obtained as above are divided into 32 sub-blocks, and the maximum values of the respective sub-blocks are obtained to search out the scale factors of respective blocks using a preset scale factor table. In this instance, each sub-block has 16 FFT coefficients. As one specific example, when the maximum value of the first sub-block is −467.54, 512 which is disposed near and greater than the absolute value 467.54 is selected in the scale factor table. Thus, the bit pattern 101010, i.e., 42, representing 512 becomes the scale factor. At this time, the scale factor table has 6-bit pattern.

The masking level operator 13 obtains the masking level of affecting respective sub-blocks by multiplying the masking effect coefficient affecting one sub-block to the other sub-blocks. For example, if the scale factor of the first sub-block is 42 and the masking level of other sub-blocks affecting the first sub-block is 8, the output is 34 (where 42−8=34).

At this time, the block and total energy operator 14 obtains the sub-block energy and total block energy by means of the masking level from the masking level operator 13. The adaptive bit allocator 15 adaptively allocates bits to respective sub-blocks by using the correlation of the sub-block energy and the total block energy from the block and total energy operator 14 to determine the word length WL. For example, when the entire energy is 165000 and the allocable number of bits is 1200, the word length WL of the first sub-block can be written as:

$$WL = \frac{34^2}{165000} \times 1200 = 8$$

Thereafter, the word length WL of the following sub-blocks are obtained as the above method.

The parameter operator 16 compares the masking level from the masking level operator 13 with the scale factor SF to determine and output the number N of sub-blocks in such a manner that the value of the parameter N is increased by one when the scale factor SF is greater than the masking level. If the scale factor SF is not greater than the masking level, N is not increased.

Also, the received spectrum signal SP is normalized and quantized to respective blocks in accordance with the scale factor SF from the spectrum signal normalizer and quantizer 17 to the scale factor operator 12 and the word length WL from the adaptive bit allocator 15, thereby being supplied as the quantization data QSP. For instance, assuming that 512 spectrum signals SP are formed to be divided as 32 sub-blocks to be normalized and quantized, and that the first spectrum signal SP of the first sub-block is 47.32, the word length WL is 8, and the scale factor 512, the quantization data QSP can be obtained by:

$$QSP = \frac{47.32}{512} \times (2^{(8-1)} - 1) = 11.7375$$

where the constant number of 11.7375 can be expressed by the 8 bit number '00001011', and the spectrum signal SP is normalized and quantized as the above.

On the other hand, the spectrum signal SP during the inverse quantization is written as:

$$SP = SF \times \frac{QSP}{2^{(WL-1)} - 1}$$

As in the above equation, the scale factor SF is an important element. Moreover, since the word lengths WL of respective sub-blocks are obtained only by the scale factors SF in the present invention, the error occurring while recording, transmitting, or reproducing the scale factor SF, must be corrected. For this purpose, the scale factor error-correcting data generator 13 is utilized in the encoding step to produce the error correction data ED as follows.

The scale factor SF from the scale factor operator 12 is divided by the sum of odd numbers or even numbers of respective blocks. In other words, $$\text{Sum of odds} = \sum_{i=0}^{31} SFi, \text{ where } i = \text{odd numbers}$$

$$\text{Sum of evens} = \sum_{i=0}^{31} SFi, \text{ where } i = \text{even numbers}$$

The data recorded or transmitted during the encoding process is the quantization data QSP, scale factor SF, and the number N of sub-blocks of the spectrum signal. The word length WL is neither recorded nor transmitted. Accordingly, the recording or transmitting area in the conventional recorded or transmitted data occupied by the word length WL is excluded, side information is minimized, and the quantization data QSP of the spectrum signal occupies the saved area. The quantization data QSP, scale factor SF, error correction data ED, and the number N of sub-blocks obtained through the above-described process are formatted in the data storing and error correcting coder 19, and changed into the code with correctable error, e.g., Reed-Solomon code, to be supplied as shown in FIG. 5. Consequently, a much greater number of bits allocable in the adaptive bit allocator 15 is secured and, using the method described below, the original spectrum signal SP is restored from the data recorded or transmitted in the foregoing method.

As depicted in FIG. 4, in restoring the original spectrum signal SP, the quantization data QSP, scale factor SF, and the number N of sub-blocks transmitted in the above-stated encoding process, are utilized. The recorded or transmitted encoding data is received into the data storage and error corrector 20 to detect whether or not an error occurs. When the error is detected, the data with correctable error is corrected, and data with incorrigible error accompanies the error flag Eflag in predetermined bit unit, e.g., 5-bit unit, which is supplied along with the scale factor SF, error correction data ED, and the number N of sub-blocks.

The error correction data ED and error flag Eflag from the data storage and error corrector 20 are used by the scale factor error corrector 26 for correcting the error of the scale factor SF and the number N of sub-blocks from the data storage and error corrector 20. A more specific description of this process is given below.

First, when the error flag Eflag occurs only in the error correction data ED, the scale factor error corrector 26 outputs the received scale factor SF without change. Second, when the error flag Eflag occurs only in the number N of sub-blocks, the sum of odd numbers and even numbers of the error correction data ED is the sum of the squares $SF^2$ of the scale factor SF. Accordingly, the number of the scale factors SFi can be realized by the sum of odd numbers and even numbers, so that the number N of whole sub-blocks is obtained by the sum of the odd and even numbers. Third, if the error of a certain scale factor SFi is not corrected, the odd and even scale factors SFi are incorrect when, e.g., the error flag Eflag is generated in 1-byte (8 bits) units. That is, as illustrated in the following table, the first bit B0 to the sixth bit B5 are the bit pattern of the scale factor SF0, and the seventh and eighth bits B6 and B7 are the upper two bit patterns of the scale factor SF1. Thus, the two scale factors are incorrect.

| B0 | B1 | B2 | B3 | B4 | B5 | B6 | B7 |
| --- | --- | --- | --- | --- | --- | --- | --- |

In this case, the scale factor SF0 and SF1 are obtained as the following:

$$SF0 = \text{Sum of evens} = \sum_{i=2}^{31} SFi, \text{ where } i = \text{even numbers}$$

$$SF1 = \text{Sum of odds} = \sum_{i=3}^{31} SFi, \text{ where } i = \text{odd numbers}$$

The scale factor SF from the data storage and error corrector 20 is temporarily stored in the buffer 21, and the masking level operator 22 extracts the masking level by using only the scale factor SF from the buffer 21 as in the masking level operator 13 of the digital signal encoding apparatus shown in FIG. 3.

The block and total energy operator 23, as in the block and total energy operator 14 of the digital signal encoding apparatus shown in FIG. 3, calculates the total block energy and sub-block energy based on the scale factor SF from the buffer 21 and the masking level from the masking level operator 22 to supply the result to the adaptive bit allocator 24.

By this operation, the adaptive bit allocator 24 uses the correlation of the sub-block energy and total block energy from the block and total energy operator 23 to obtain the adaptive word length WL per sub-block as in the adaptive bit allocator 15 shown in FIG. 3.

The quantization data QSP of the spectrum signal from the data storage and error corrector 20 is restored into the original spectrum signal SP in the quantization data inverse quantizer 25 in accordance with the scale factor SF, the number N of sub-blocks from the scale factor error corrector 26, and word length WL from he adaptive bit allocator 24 as follows:

$$SP = SF \times \frac{QSP}{2^{(WL-1)} - 1}$$

In other words, the word length WL per sub-block has the same value as the word length WL in the decoding apparatus shown in FIG. 4, and the spectrum signal SP can be perfectly restored even though the word length WL is neither recorded nor transmitted as above. Additionally, in the digital signal encoding/decoding apparatuses according to the present invention, the same effect can be obtained even if the scale factor SF is replaced with the mean square.

The invention will be further clarified by the following example of the operation of the digital signal encoding/decoding apparatuses, which is intended to be purely exemplary of the invention. Analog audio data is converted into the PCM data, and the PCM data of fixed time and fixed number forms one block to be discrete cosine transformed on the frequency axis perpendicular to the time axis and divided into several subbands, i.e., sub-blocks. By allowing the PCM data to number 1024 and be divided into 32 subbands, one subband has 32 DCT coefficients. Here, the scale factors SF of respective subbands are represented by sf0, sf1, sf2, . . . , sf31. The masking level affected by the scale factors sf0, sf1, sf2, . . . , sf31 of respective subbands are calculated in advanced to be stored in a ROM within the masking level operator 22. That is, the masking levels are sequentially obtained from the first scale factor sf0 to the 32th scale factor sf31, which are designated by ML0, ML1, ML2, . . . , ML31.

Then, the scale factor sfi and masking level MLi (where, i is a constant from 0 to 31) of respective subbands are compared. After this, the energy of the subband is obtained only when the scale factor sfi is greater than the masking level MLi (i.e., sfi>MLi), and this value is calculated to correspond to the band number and scale factor SF of the subband, and is stored in a ROM within the block and total energy operator 23.

The obtained sub-block energy is added to the total sub-block energy, and the sub-block energy is obtained in this manner until the last one is added to the total sub-block energy, so that the total block energy is obtained. Thereafter, the word length WL is obtained by multiplying the ratio of the total block energy and the sub-block energy by the allocable number of bits. For example, if the allocable number of bits is 1000, the total block energy is 8000, and subband energy is 39, the word length WL is provided as below:

$$WL = 1000 \times \frac{39}{8000} = 4.875$$

Thus, roughly 5 bits are allocated as the word length WL. Using this result, the quantization data QSP is inversely quantized in the quantization-data inverse quantizer 25 to be restored into the original spectrum signal SP.

Figure 6:
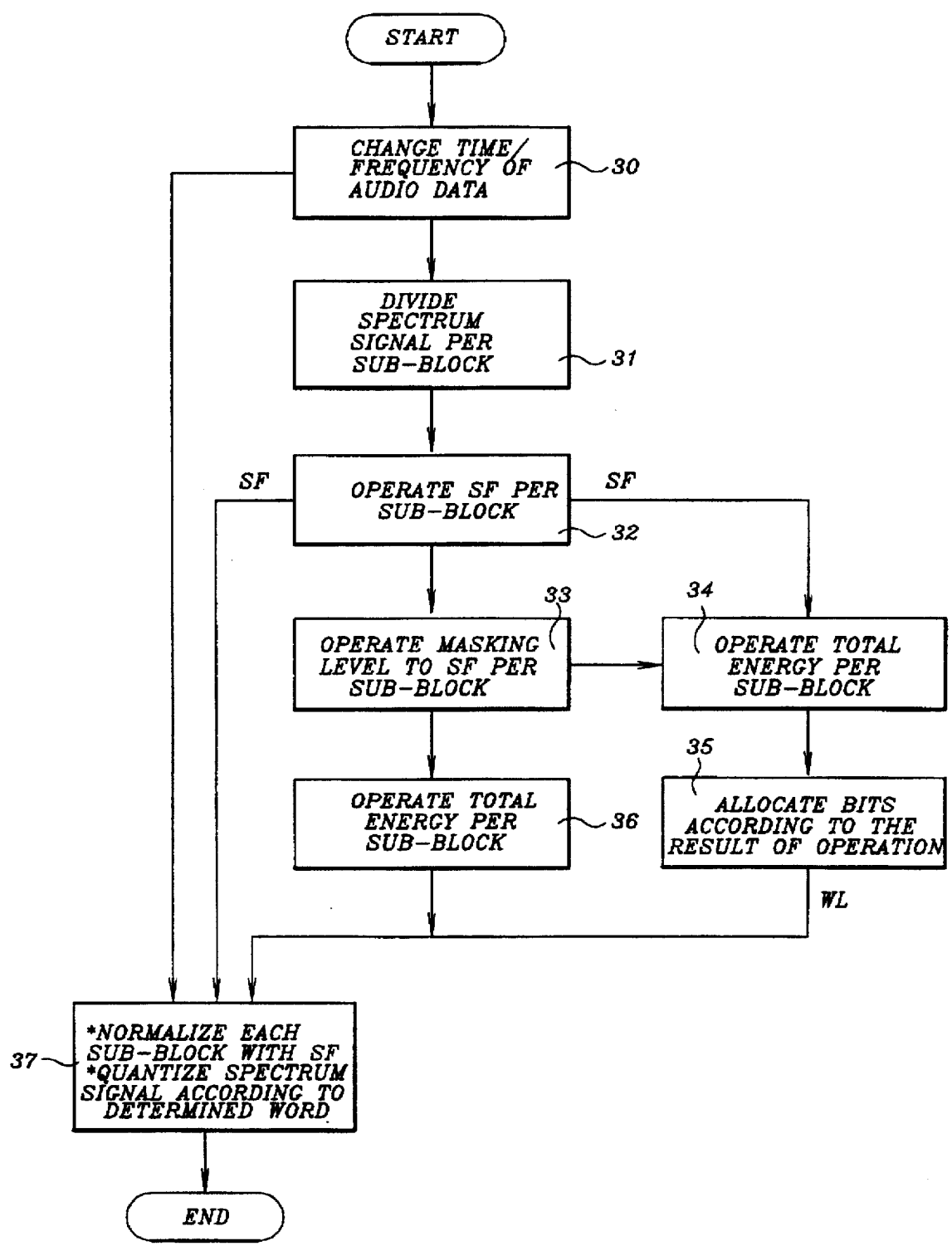
FIG. 6 is a flowchart of an encoding method of the digital method according to the present invention.

The digital signal encoding method according to the present invention will be described with reference to FIG. 6. The digital audio data divided to a block unit on a predetermined time axis is converted in time and frequency basis to obtain the corresponding spectrum signal SP (step 30). The obtained spectrum signal SP is divided into a predetermined number of sub-blocks on the frequency axis (step 31). The scale factor SF is obtained per sub-block (step 32), and the masking level with respect to the scale factor SF per sub-block is extracted (step 33). Using the obtained scale factor SF per sub-block and masking level, the sub-block energy and total block energy are determined (step 34). Then, bits are allocated to respective sub-blocks in accordance with the correlation of the sub-block energy with respect to the total block energy to determine the word length per sub-block (step 35). The number N of sub-blocks to be transmitted or recorded with respect to the operated masking level and word length is determined (step 36). Finally, the spectrum signal SP is normalized according to the scale factor SF per sub-block and quantized according to the word length WL (step 37).

The digital signal decoding method of the digital signal encoded as set forth above according to the present invention will be described. First, the transmitted data is stored, and the masking level with respect to the scale factor per sub-block is extracted in the stored data.

When the error occurs in the stored data after extracting the masking level, the error correction step is executed. More specifically, in connection with the occurrence of the error in the stored data, the correctable error is corrected or the error flag generation step is performed in case of the incorrigible error. Then, the step of correcting the error of the scale factor and number of sub-blocks is carried out such that the error of the sub-block scale factor SF and the number N of sub-blocks in the data stored in accordance with the generated error flag Eflag and the error correction data ED is corrected.

Here, in the step of correcting the error of the scale factor and number of sub-blocks, the scale factor SF is supplied unchanged when the error flag Eflag is generated only in the error correction data ED. When the error flag Eflag is generated only in the number N of sub-blocks, however, the sum of the odd and even numbers of the error correction data ED is used to obtain the number N of sub-blocks. Moreover, when the error of the scale factor SF of the sub-block is not corrected, the sum of the even and odd numbers are used to obtain the scale factor SF of the corresponding sub-block. In other words, when the error flag Eflag is generated only in the number N of sub-blocks, the sum of the odd numbers and even numbers is the sum of the square roots $SF^2$ of the scale factor SF, so that the number of the scale factor SFi is realized both in the sum of the odd numbers and the even numbers. Therefore, the number N of entire sub-blocks can be obtained by the sum of the odd numbers and even numbers. Furthermore, if the error of the scale factor SF is not corrected, the scale factors SF0 and SF1 are obtained by means of the following equation:

$$SF0 = \text{Sum of evens} = \sum_{i=2}^{31} SFi, \text{ where } i = \text{even numbers}$$

$$SF1 = \text{Sum of odds} = \sum_{i=3}^{31} SFi, \text{ where } i = \text{odd numbers}$$

After extracting the masking level, the total block energy and sub-block energy are calculated by using the scale factor. SF per sub-block, and the adaptive word length WL per sub-block is obtained by using the correlation of the sub-block energy and total block energy.

By means of the number N of sub-blocks, scale factor SF per sub-block, word length WL in the stored data, the inverse quantization with respect to the quantization data QSP is performed to restore the original spectrum signal SP.

As described above, when forming an audio spectrum signal to a block unit to be recorded or transmitted, or restoring data to be recorded or transmitted, the present invention allows for highly efficient encoding/decoding without recording or transmitting word lengths. Bits are allocated in such a manner that an area formerly held by the word lengths is occupied by quantization data of the spectrum signal, thereby providing capable of obtaining an audio signal of high quality.

While the present invention has been particularly shown and described with reference to a particular embodiment thereof, it will be understood by those skilled in the art that various changes in form and details of the present invention may be effected therein without departing from the spirit and scope of the invention as defined by the appended claims.

What is claimed is:

1. A digital signal decoding apparatus comprising:

a data storing and error correcting portion for decoding recorded or transmitted encoding data to supply quantization data, scale factors, error correction data, and a number of sub-blocks, for correcting a correctable error, and for generating an error flag with respect to an uncorrectable error;

a masking level operating portion for extracting a masking level of said scale factors from said data storing and error correcting portion;

a block and total energy operating portion for calculating total block energy and sub-block energy, using said scale factors from said data storing and error correcting portion and said masking level from said masking level operating portion;

an adaptive bit allocating portion for obtaining adaptive word length per sub-block, using the correlation of said total block energy and said sub-block energy from said block and total energy operating portion; and a quantization-data inverse quantizing portion for performing inverse quantization, using said scale factors, quantization data and said number of sub-blocks from said data storing and error correcting portion, and said word length from said adaptive bit allocating portion.

2. The digital signal decoding apparatus of claim 1, further comprising a buffer for temporarily storing said scale factors from said data storing and error correcting portion and supplying said scale factors to said block and total energy operating portion and said masking level operator portion.

3. A digital signal decoding apparatus comprising:

a data storing and error correcting portion for decoding recorded or transmitted encoding data to supply quantization data, scale factors, error correction data, and a number of sub-blocks, for correcting a correctable error, and for generating an error flag with respect to an uncorrectable error;

a scale factor error correcting portion for correcting information having the error among the scale factors, the error correction data, and the number of sub-blocks from the data storing and error correcting portion by means of entire information with respect to the error designated by the error flag, wherein the scale factors and the number of sub-blocks are supplied to a quantization-data inverse quantizing portion;

a masking level operating portion for extracting a masking level of said scale factors from said data storing and error correcting portion;

a block and total energy operating portion for calculating total block energy and sub-block energy, using said scale factors from said data storing and error correcting portion and said masking level from said masking level operating portion;

an adaptive bit allocating portion for obtaining adaptive word length per sub-block, using the correlation of said total block energy and said sub-block energy from said block and total energy operating portion; and the quantization-data inverse quantizing portion for performing inverse quantization, using said scale factors and said number of sub-blocks from said scale error correcting portion, said quantization data from said data storing and error correcting portion, and said word length from said adaptive bit allocating portion.

4. The digital signal decoding apparatus of claim 3, further comprising a buffer for temporarily storing said scale factors from said data storing and error correcting portion and supplying said scale factor to said block and total energy operating portion and said masking level operator portion.

5. A digital signal decoding method comprising the steps of:

storing transmitted data, and extracting a masking level with respect to a scale factor for each sub-block in the stored data;

correcting a correctable error in said stored data, and generating an error flag for an uncorrectable error in said stored data;

correcting a scale factor error for each said sub-block and the number of sub-blocks in said stored data in accordance with said error flag and error corrected data in said stored data;

calculating total block energy and sub-block energy, using said scale factor for each sub-block and said masking level;

obtaining an adaptive word length per sub-block, using the correlation of said sub-block energy and total block energy; and performing inverse quantization with respect to quantization data in said stored data by means of the number of sub-blocks, said scale factor for each sub-block and said word length in said stored data to restore an original spectrum signal.

6. The digital signal decoding method of claim 5, wherein said step of correcting said scale factor error for each sub-block and said number of sub-blocks includes the steps of:

supplying the scale factor unchanged when said error flag is generated in said error correction data only;

determining the number of sub-blocks by summing odd numbers and even numbers of said error correction data when said error flag is generated in the number of sub-blocks only; and determining said scale factor of corresponding sub-block by summing odd numbers and even numbers when said error in said scale factor of said sub-block is not corrected.

* * * * *